United States Patent
Xu et al.

(10) Patent No.: US 11,889,563 B2
(45) Date of Patent: Jan. 30, 2024

(54) RANDOM ACCESS METHOD AND APPARATUS

(71) Applicant: Huawei Technologies Co., Ltd., Shenzhen (CN)

(72) Inventors: Chenlei Xu, Hangzhou (CN); Jianwei Zhou, Hangzhou (CN); Hejia Luo, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 17/459,544

(22) Filed: Aug. 27, 2021

(65) Prior Publication Data
US 2021/0392703 A1 Dec. 16, 2021

Related U.S. Application Data

(63) Continuation of application No. PCT/CN2020/076807, filed on Feb. 26, 2020.

(30) Foreign Application Priority Data

Feb. 28, 2019 (CN) .......................... 201910153431.4

(51) Int. Cl.
*H04W 74/08* (2009.01)
*H04J 13/00* (2011.01)
*H04L 27/26* (2006.01)

(52) U.S. Cl.
CPC ..... *H04W 74/0841* (2013.01); *H04J 13/0062* (2013.01); *H04L 27/2607* (2013.01); *H04L 27/2663* (2013.01)

(58) Field of Classification Search
CPC . H04J 13/0062; H04J 13/102; H04L 27/2665; H04L 27/2613; H04L 27/2663;
(Continued)

(56) References Cited

U.S. PATENT DOCUMENTS 11,201,770 B2 * 12/2021 Zhang ............... H04W 56/0005
2010/0311428 A1 * 12/2010 Zhang ................... H04L 5/0007
455/447
(Continued)

FOREIGN PATENT DOCUMENTS

| CN | 101394226 A | 3/2009 |
|---|---|---|
| CN | 101409584 A | 4/2009 |

(Continued)

OTHER PUBLICATIONS

LG Electronics, "NPRACH reliability for NB-Iot", 3GPP TSG RAN WG1 Meeting #89, R1-1707576, Hangzhou, P. R. China, May 15-19, 2017, 3 pages.

(Continued)

*Primary Examiner* — Oussama Roudani
(74) *Attorney, Agent, or Firm* — Slater Matsil, LLP

(57) ABSTRACT

This application provides a random access method and an apparatus. The method includes: receiving, by a terminal device, a broadcast signal; and sending, by the terminal device, a random access signal, where a preamble sequence in the random access signal includes K first symbols and Q second symbols, the first symbol and the second symbol are different from each other, K and Q are integers greater than or equal to 1, $K+Q=N_{SEQ}$, and $N_{SEQ}$ is a quantity of symbols included in the preamble sequence.

23 Claims, 8 Drawing Sheets

(58) Field of Classification Search
CPC ............ H04L 27/2607; H04L 27/2605; H04L 27/26132; H04L 27/2686; H04L 27/2675; H04B 7/1853; H04W 74/0841; H04W 7/1851; H04W 56/0015
See application file for complete search history.

(56) References Cited

U.S. PATENT DOCUMENTS

| | | | |
|---|---|---|---|
| 2015/0131756 A1 | 5/2015 | Suh et al. | |
| 2017/0195155 A1* | 7/2017 | Zhang | H04L 27/2655 |
| 2017/0332409 A1 | 11/2017 | Yerramalli et al. | |
| 2018/0092129 A1 | 3/2018 | Guo et al. | |
| 2019/0075593 A1* | 3/2019 | Mauritz | H04J 13/0062 |
| 2019/0158337 A1* | 5/2019 | Yoon | H04W 74/0841 |
| 2019/0239249 A1* | 8/2019 | Sahlin | H04L 27/2663 |
| 2019/0260628 A1* | 8/2019 | Lin | H04L 27/2666 |
| 2021/0376946 A1* | 12/2021 | Zhang | H04L 27/2613 |

FOREIGN PATENT DOCUMENTS

| | | |
|---|---|---|
| CN | 102036408 A | 4/2011 |
| CN | 106464627 A | 2/2017 |
| CN | 107396454 A | 11/2017 |
| CN | 108293262 A | 7/2018 |
| CN | 108306841 A | 7/2018 |
| CN | 108633100 A | 10/2018 |
| WO | 2018174494 A1 | 9/2018 |
| WO | 2018195984 A1 | 11/2018 |
| WO | 2020164105 A1 | 8/2020 |

OTHER PUBLICATIONS

Nokia et al., "NR Physical Random Access Channel", 3GPP TSG-RAN WG1#89, R1-1708243, Hangzhou, China, May 15-19, 2017, 36 pages.

Samsung, "NR PRACH design", 3GPP TSG RAN WG1 #89, R1-1707932, Hangzhou, China, May 15-19, 2017, 13 pages.

Zhen, L. et al., "Random Access Preamble Design and Detection for Mobile Satellite Communication Systems", IEEE Journal on Selected Areas in Communications, vol. 36, No. 2, XP055872810, Feb. 2018, 12 pages.

* cited by examiner

RANDOM ACCESS METHOD AND APPARATUS

CROSS-REFERENCE TO RELATED APPLICATIONS

This application is a continuation of International Application No. PCT/CN2020/076807, filed on Feb. 26, 2020, which claims priority to Chinese Patent Application No. 201910153431.4, filed on Feb. 28, 2019. The disclosures of the aforementioned applications are hereby incorporated by reference in their entireties.

TECHNICAL FIELD

This application relates to a random access method, and in particular, to a random access method and an apparatus.

BACKGROUND

In a random access procedure, a terminal device sends a preamble sequence to an access network device. The access network device may obtain uplink timing by detecting a location of the preamble sequence, and send the uplink timing to the terminal device by using timing information. The terminal device and the access network device may perform a subsequent communication process based on the timing information.

A future communication network such as a fifth generation mobile communication network (5G) not only needs to satisfy service requirements of various industries, but also needs to provide wider service coverage. Satellite communication has advantages such as a long communication distance, a large coverage area, and a wide communication frequency band. Therefore, the industry considers integrating 5G communication with a satellite system, to provide a communications service with more powerful performance. A random access preamble sequence in an existing communications protocol is designed mainly for a ground cellular cell. Therefore, it is difficult for the design of the current random access preamble sequence to satisfy a communication requirement of a future communication network.

SUMMARY

This application provides a random access method and an apparatus, to improve efficiency of random access signal detection.

According to a first aspect, a random access method is provided, and includes: receiving, by a terminal device, a broadcast signal; and sending, by the terminal device, a random access signal, where a preamble sequence in the random access signal includes K first symbols and Q second symbols, the first symbol and the second symbol are different from each other, K and Q are integers greater than or equal to 1, $K+Q=N_{SEQ}$, and $N_{SEQ}$ is a quantity of symbols included in the preamble sequence.

In this embodiment of this application, the first symbol and the second symbol that are different from each other are set in the preamble sequence in the random access signal, so that efficiency of random access signal detection can be improved, and an access requirement of a satellite communication system or other communications systems can be satisfied.

With reference to the first aspect, in a possible implementation, the Q second symbols are the same symbols.

With reference to the first aspect, in a possible implementation, the random access signal includes a cyclic prefix, the preamble sequence, and a guard time, and the K first symbols and the Q second symbols satisfy at least one of the following conditions: an interval between any two of the K first symbols$\geq N_{CP}^{i}$; $N_{SEQ} \geq K \times (N_{CP}^{i}+1)$; and $T_{SEQ} \geq T_{CP} \geq \Delta T_{RTD}$, and $T_{SEQ} \geq T_{GT} \geq \Delta T_{RTD}$, where $N_{CP}^{i}$ represents an integral part of a quantity of symbols included in the cyclic prefix, $T_{SEQ}$ represents a time length of the preamble sequence, $T_{CP}$ represents a time length of the cyclic prefix, $T_{GT}$ represents a time length of the guard time, and $\Delta T_{RTD}$ represents a maximum round trip transmission delay difference in a cell.

In this embodiment of this application, a requirement of a constraint condition that the CP, the preamble sequence, and the GT need to satisfy is designed, so that a performance gain of random access signal detection can be improved.

With reference to the first aspect, in a possible implementation, K is a maximum number that satisfies the condition.

With reference to the first aspect, in a possible implementation, the K first symbols are the same symbols.

With reference to the first aspect, in a possible implementation, the first symbol is generated based on a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $N_{U1}$ and $N_{U2}$ are integers greater than or equal to 1, $1 \leq u_1 \leq N_{U1}$, and $1 \leq u_2 \leq N_{U2}$.

In this embodiment of this application, based on a feature of a non-repeated random access sequence detection algorithm, ZC sequences for generating the first symbol and the second symbol are designed, so that more preamble sequences can be obtained by using as few ZC sequences with different roots as possible, to improve random access efficiency.

With reference to the first aspect, in a possible implementation, the K first symbols are different from each other.

With reference to the first aspect, in a possible implementation, the K first symbols are generated based on ZC sequences in K third sets, each of the K third sets includes M ZC sequences generated by performing cyclic shift based on a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $1 \leq u_1 \leq N_{U1}$, $1 \leq u_2 \leq N_{U2}$, and M is an integer greater than or equal to 1; the K third sets satisfy the following condition: $CS_i = \{i \times N_{CS,1}, i \times N_{CS,2}, \ldots, i \times N_{CS,M}\}$, where $i=1, \ldots,$ or K, $CS_i$ represents a set of M cyclic shift offsets corresponding to M ZC sequences included in an $i^{th}$ third set, and $1 \leq i \leq K$; and the K first symbols have one-to-one correspondence with the K third sets, where an $i^{th}$ first symbol is generated by using a ZC sequence whose cyclic shift offset is $i \times N_{cs,m}$ and that is in the $i^{th}$ third set, and $1 \leq m \leq M$.

In this embodiment of this application, based on a feature of a non-repeated random access sequence detection algorithm, ZC sequences for generating the first symbol and the second symbol are designed, so that more preamble sequences can be obtained by using as few ZC sequences with different roots as possible, to improve random access efficiency.

With reference to the first aspect, in a possible implementation, the K third sets satisfy at least one of the following conditions: any two elements in a set $CS_1$ and a set $CS_2$ are different from each other; and a sum of any two different elements in the set $CS_1$ does not belong to the set $CS_2$.

With reference to the first aspect, in a possible implementation, the length of the cyclic prefix CP in the random access signal is greater than a length of one symbol.

According to a second aspect, a random access method is provided, and includes: sending, by an access network device, a broadcast signal; and receiving, by the access network device, a random access signal, where a preamble sequence in the random access signal includes K first symbols and Q second symbols, the first symbol and the second symbol are different from each other, K and Q are integers greater than or equal to 1, $K+Q=N_{SEQ}$, and $N_{SEQ}$ is a quantity of symbols included in the preamble sequence.

In this embodiment of this application, the first symbol and the second symbol that are different from each other are set in the preamble sequence in the random access signal, so that efficiency of random access signal detection can be improved, and an access requirement of a satellite communication system or another communications system can be satisfied.

With reference to the second aspect, in a possible implementation, the Q second symbols are the same symbols.

With reference to the second aspect, in a possible implementation, the random access signal includes a cyclic prefix, the preamble sequence, and a guard time, and the K first symbols and the Q second symbols satisfy at least one of the following conditions: an interval between any two of the K first symbols $N_{CP}^i$; $N_{SEQ} \geq K \times (N_{CP}^i, +1)$; and $T_{SEQ} \geq T_{CP} \geq \Delta T_{RTD}$, and $T_{SEQ} \geq T_{GT} \geq \Delta_{RTD}$, where $N_{CP}^i$ represents an integral part of a quantity of symbols included in the cyclic prefix, $T_{SEQ}$ represents a time length of the preamble sequence, $T_{CP}$ represents a time length of the cyclic prefix, $T_{GT}$ represents a time length of the guard time, and $\Delta T_{RTD}$ represents a maximum round trip transmission delay difference in a cell.

With reference to the second aspect, in a possible implementation, K is a maximum number that satisfies the condition.

With reference to the second aspect, in a possible implementation, the K first symbols are the same symbols.

With reference to the second aspect, in a possible implementation, the first symbol is generated based on a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $N_{U1}$ and $N_{U2}$ are integers greater than or equal to 1, $1 \leq u_1 \leq N_{U1}$, and $1 \leq u_2 \leq N_{U2}$.

With reference to the second aspect, in a possible implementation, the K first symbols are different from each other.

With reference to the second aspect, in a possible implementation, the K first symbols are generated based on ZC sequences in K third sets, each of the K third sets includes M ZC sequences generated by cyclically shifting a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $1 \leq u_1 \leq N_{U1}$, $1 \leq u_2 \leq N_{U2}$, and M is an integer greater than or equal to 1; the K third sets satisfy the following condition: $CS_i = \{i \times N_{CS,1}, i \times N_{CS,2}, \ldots, i \times N_{CS,M}\}$, where $i=1, \ldots,$ or K, $CS_i$ represents a set of M cyclic shift offsets corresponding to M ZC sequences included in an $i^{th}$ third set, and $1 \leq i \leq K$; and the K first symbols have one-to-one correspondence with the K third sets, where an $i^{th}$ first symbol is generated by using a ZC sequence whose shift offset is $i \times N_{cs,m}$ and that is in the $i^{th}$ third set, and $1 \leq m \leq M$.

With reference to the second aspect, in a possible implementation, the K third sets satisfy at least one of the following conditions: any two elements in sets $CS_1$ and $CS_2$ are different from each other; and a sum of any two different elements in the set $CS_1$ does not belong to the set $CS_2$.

With reference to the second aspect, in a possible implementation, the length of the cyclic prefix in the random access signal is greater than a length of one symbol.

According to a third aspect, an apparatus is provided. The apparatus provided in this application has a function of implementing behavior of the terminal device or the access network device in the aspects of the foregoing methods, and includes a corresponding means (means) configured to perform the steps or the functions described in the aspects of the foregoing methods. The steps or functions may be implemented by using software, hardware (for example, a circuit), or a combination of hardware and software.

In a possible design, the apparatus includes one or more processors and a communications unit. The one or more processors are configured to support the apparatus in performing corresponding functions of the terminal device in the foregoing methods, for example, in sending a random access signal to an access network device. The communications unit is configured to support the apparatus in communicating with another device, to implement a receiving function and/or a sending function, for example, to receive a random access signal.

Optionally, the apparatus may further include one or more memories. The memory is configured to be coupled to the processor, and the memory stores a program instruction and/or data that are/is necessary for the apparatus. The one or more memories may be integrated with the processor, or may be disposed independent of the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the terminal device in any one of the first aspect or the possible implementations of the first aspect.

In a possible design, the apparatus includes one or more processors and a communications unit. The one or more processors are configured to support the apparatus in performing corresponding functions of the access network device in the foregoing methods, for example, in receiving a random access signal from a terminal device. The communications unit is configured to support the apparatus in communicating with another device, to implement a receiving function and/or a sending function, for example, to send reference signal indication information.

Optionally, the apparatus may further include one or more memories. The memory is configured to be coupled to the processor, and the memory stores a program instruction and/or data that are/is necessary for the access network device. The one or more memories may be integrated with the processor, or may be disposed independent of the processor. This is not limited in this application.

The apparatus may be a base station, a gNB, a transceiver point (transceiver point, TRP), or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the access network device in any one of the second aspect or the possible implementations of the second aspect.

According to a fourth aspect, a system is provided. The system includes the foregoing terminal device and the foregoing access network device.

According to a fifth aspect, a computer-readable storage medium is provided, and is configured to store a computer program. The computer program includes an instruction used to perform the method according to any one of the first aspect or the possible implementations of the first aspect.

According to a sixth aspect, a computer-readable storage medium is provided, and is configured to store a computer program. The computer program includes an instruction used to perform the method according to any one of the second aspect or the possible implementations of the second aspect.

According to a seventh aspect, a computer program product is provided. The computer program product includes computer program code. When the computer program code is run on a computer, the computer is enabled to perform the method according to any one of the first aspect or the possible implementations of the first aspect.

According to an eighth aspect, a computer program product is provided. The computer program product includes computer program code. When the computer program code is run on a computer, the computer is enabled to perform the method according to any one of the second aspect or the possible implementations of the second aspect.

DETAILED DESCRIPTION OF ILLUSTRATIVE EMBODIMENTS

The following describes technical solutions in this application with reference to accompanying drawings.

The technical solutions in embodiments of this application are applicable to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS) system, a worldwide interoperability for microwave access (WiMAX) communications system, a 5th generation (5G) system, or a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

An access network device in the embodiments of this application may be a device configured to communicate with the terminal device. The access network device may be a base transceiver station (BTS) in the global system for mobile communications (GSM) system or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the access network device may be a relay node, an access point, a vehicle-mounted device, a wearable device, an access network device in the 5G network, an access network device in the future evolved PLMN, or the like. This is not limited in the embodiments of this application.

Figure 1:
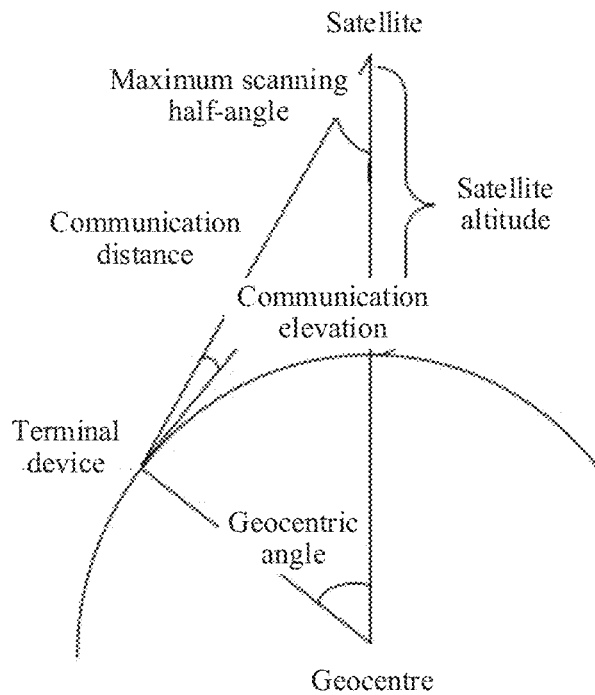
FIG. 1 is a schematic diagram of an application scenario according to an embodiment of this application.

FIG. 1 is a schematic diagram of a possible application scenario according to an embodiment of this application. In FIG. 1, a satellite may be used as an access network device to implement wide-area coverage. In this scenario, a protocol stack compatible with an existing protocol may be used. In some examples, an access network device or an entity apparatus that implements a function of an access network device may be disposed on a satellite. The satellite is not only configured to implement signal sending and receiving between the satellite and a terminal device, but also configured to implement another function of the access network device. In some other examples, an access network device or an entity apparatus that implements a function of an access network device may be disposed on the ground. A satellite is only configured to implement signal transfer or transparent transmission between the access network device and a terminal device, and the access network device disposed on the ground implements another function of the access network device.

Based on an orbit height of a satellite, satellite communication systems may be classified into a geostationary earth orbit (GEO) system, a medium earth orbit (MEO) satellite communication system, and a low earth orbit (LEO) satellite communication system. A low earth orbit satellite becomes a focus of attention because of advantages such as a low data transmission delay, a low power loss, a low transmission cost, and being able to implement global coverage.

In a random access procedure specified in a communications protocol, a terminal device may send a random access signal selected from a specified set to an access network device. The random access signal includes a preamble sequence. The access network device obtains uplink timing by detecting a location of the preamble sequence. Then, the access network device sends timing information including the uplink timing to the terminal device.

However, a transmission distance of satellite communication is long, and a radius of a beam cell of a satellite communication system is larger than that of a ground cellular cell. Therefore, there is a larger maximum round trip transmission delay difference between users in the cell. This imposes a requirement different from that of the ground cellular cell on a design of the random access signal. For example, a longer random access preamble sequence needs to be used.

It should be noted that the solutions in the embodiments of this application are applicable to a satellite communication scenario, but are not limited to the satellite communication scenario. For example, the solutions are applicable to a ground communication cell with a relatively large cell radius or other types of communication cell.

Figure 2:
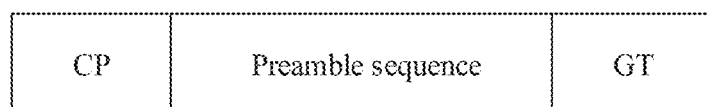
FIG. 2 is a schematic diagram of a random access signal in time domain according to an embodiment of this application.

FIG. 2 is a schematic diagram of a random access signal in time domain. In this application, the random access signal may also be referred to as a random access preamble sequence. The random access signal includes a cyclic prefix (CP), a preamble sequence (preamble), and a guard time (GT). The cyclic prefix is used to compensate for a channel delay and resolve intersymbol interference. The preamble sequence is generated by using a ZC sequence. A full name of the ZC sequence is a Zadoff-Chu sequence, and the ZC sequence may also be referred to as a generalized chirp-like sequence. The guard time is used to prevent interference between a current frame of data and a next frame of data. In some examples, the guard time may not be filled with data. Alternatively, to facilitate data processing, a segment of useless data may be filled in the guard time part. A time length of the CP is usually greater than a maximum round trip transmission delay difference in a cell, and a time length of the GT is also greater than the maximum round trip transmission delay difference in the cell.

A method for generating the ZC sequence may be represented by the following formula:

$$x_u(n) = e^{-j\frac{\pi u n(n+1)}{N_{zc}}}, 0 \le n \le N_{zc} - 1 \quad (1)$$

$x_u(n)$ represents a ZC sequence whose root sequence number is u and whose length is $N_{zc}$, u represents the root sequence number of the ZC sequence, and $N_{zc}$ represents a length of the ZC sequence.

In an example, Table 1 shows parameters of a preamble format in a low frequency band below 6 GHz, and Table 2 shows system parameters supported by the preamble format in Table 1. $T_{CP}$ represents a time length of the cyclic prefix, $T_{SEQ}$ represents a time length of the preamble sequence, $\Delta f_{RA}$ represents a subcarrier spacing, a time unit of $T_{CP}$ and $T_{SEQ}$ is $T_s = 1/(1500 \times 2048) = 32.6$ ns, and PRACH represents a physical random access channel (PRACH). A guard time refers to a time length of the guard time.

TABLE 1

| Preamble format | $T_{CP}$ | $T_{SEQ}$ | $\Delta f_{RA}$ (kHz) |
|---|---|---|---|
| 0 | 3168 | 24576 | 1.25 |
| 1 | 21024 | 2*24567 | 1.25 |
| 2 | 4668 | 4*24576 | 1.25 |
| 3 | 3168 | 4*6144 | 5 |

TABLE 2

| Preamble format | $T_{CP}$ (ms) | $T_{SEQ}$ (ms) | Quantity of occupied subframes | PRACH duration (ms) | Guard time (ms) | Supported maximum cell radius |
|---|---|---|---|---|---|---|
| 0 | 0.103 | 0.800 | 1 | 0.903 | 0.097 | 14 km |
| 1 | 0.684 | 1.600 | 3 | 2.284 | 0.716 | 102 km |
| 2 | 0.132 | 3.200 | 4 | 3.332 | 0.668 | 20 km |
| 3 | 0.103 | 0.800 | 1 | 0.903 | 0.097 | 14 km |

In an existing communications protocol, the ZC sequence is usually used to generate the preamble sequence. A plurality of preamble sequences based on a same root sequence may be generated by cyclically shifting the ZC sequence. However, cyclic shift dimensioning $N_{CS}$ needs to be designed. If $N_{CS}$ is excessively large, a total quantity of preamble sequences that can be generated by using each root sequence decreases. In this way, more root sequences are required to satisfy a requirement on a total quantity of preamble sequences in a cell. If $N_{CS}$ is excessively small, a correlation peak that is of a terminal device and that is detected by an access network device may fall within a detection window of another user, and a collision occurs. The cyclic shift dimensioning $N_{CS}$ needs to satisfy the following condition:

$$N_{CS} \geq \left[\left(\frac{20}{3}r + \tau_{ds}\right)\frac{N_{ZC}}{T_{Sym}}\right] + n_g \quad (2)$$

r represents a cell radius, $\tau_{ds}$ represents a maximum delay spread, $N_{ZC}$ represents the length of the ZC sequence, $T_{sym}$ represents a duration of one preamble symbol, and $n_g$ represents a quantity of guard samples attached by a pulse shaping filter of a receiver.

It can be learned from the formula (2) that a larger cell radius indicates a larger required cyclic shift dimensioning $N_{CS}$. For example, it is assumed that a communications system specifies that a single cell needs to include 64 available preamble sequences. When a maximum cell radius supported by the communications system is 102 km, the 64 preamble sequences in the cell can be generated only by using 64 different root sequences, rather than through cyclically shifting. However, a radius of a beam cell of a satellite communication system is usually greater than that of a ground cellular cell. Consequently, more root sequences cannot be generated through cyclically shifting. In addition, more users may access a single satellite cell than the ground cellular cell. If an existing preamble format is not improved, detection processing performed by the access network device on multi-user access will become quite complex.

Figure 3:
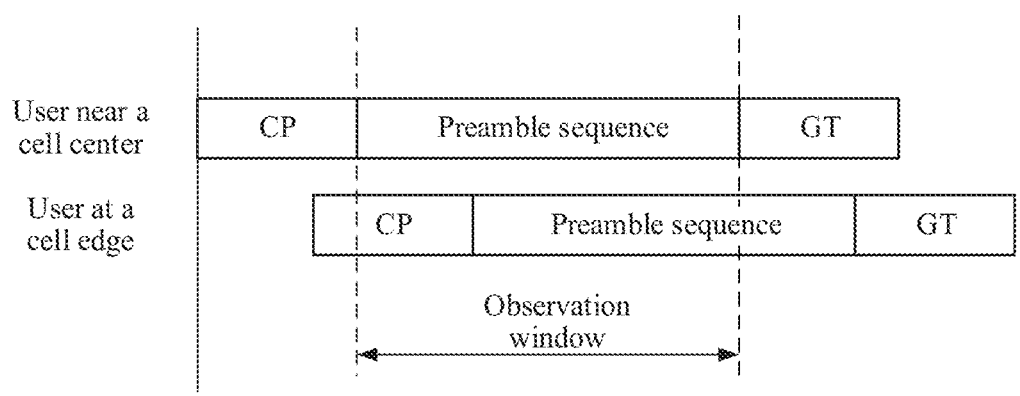
FIG. 3 is a schematic diagram of random access preamble sequence detection according to an embodiment of this application.

FIG. 3 is a schematic diagram of random access preamble sequence detection. As shown in FIG. 3, there is a round trip transmission delay difference between a user near a cell center and a user at a cell edge, and an access network device detects, by using an observation window, correlation peaks corresponding to the users. For a design of a random access signal, a time length ($T_{CP}$) of a CP of the random access signal needs to be greater than a maximum round trip transmission delay difference in a cell, and a guard time of the random access signal also needs to be greater than the maximum round trip transmission delay difference in the cell. Otherwise, uplink timing performed by the access network device on the cell may be wrong. Therefore, if a maximum round trip transmission delay difference in a beam cell is greater than $T_{CP}$, durations of a CP, a preamble sequence, and a GT of a random access signal in the beam cell need to be increased. For a satellite communication system, a round trip transmission delay difference in a beam cell may be greater than a duration that is of a maximum cyclic prefix of a preamble sequence and that is specified in an existing communications protocol. Therefore, a format of an existing preamble sequence may not satisfy an access requirement of the beam cell in the satellite communication system. For example, for a low earth orbit satellite with an orbital height of 700 kilometers (km), a diameter of a beam cell in the low earth orbit satellite is 200 km. When a minimum elevation of a user is 10°, a round trip transmission delay difference in an edge cell of the satellite is 1.3 milliseconds (ms). The round trip transmission delay difference is greater than a maximum CP time length of the existing preamble sequence.

In addition, for a ground cellular cell, $T_{CP}$ is usually less than a duration of one preamble symbol, but for a satellite communication cell, $T_{CP}$ is quite likely to be greater than the duration of the preamble symbol. Therefore, for the satellite communication cell, an access preamble detection algorithm of a ground communication system further needs to be adjusted, so that the detection algorithm can be used to detect a timing location when a maximum round trip transmission delay difference is greater than one preamble symbol.

To resolve the foregoing problem, an embodiment of this application provides a communication method. A preamble sequence in the communication method includes K first symbols and Q second symbols. The K first symbols may be the same, or may be different from each other. The Q second symbols are the same. In other words, the Q second symbols are repeated symbols. In this embodiment of this application, quantities, distribution, and filling content of the first symbols and the second symbols may be designed, to improve detection efficiency of random access signal detection.

Figure 4:
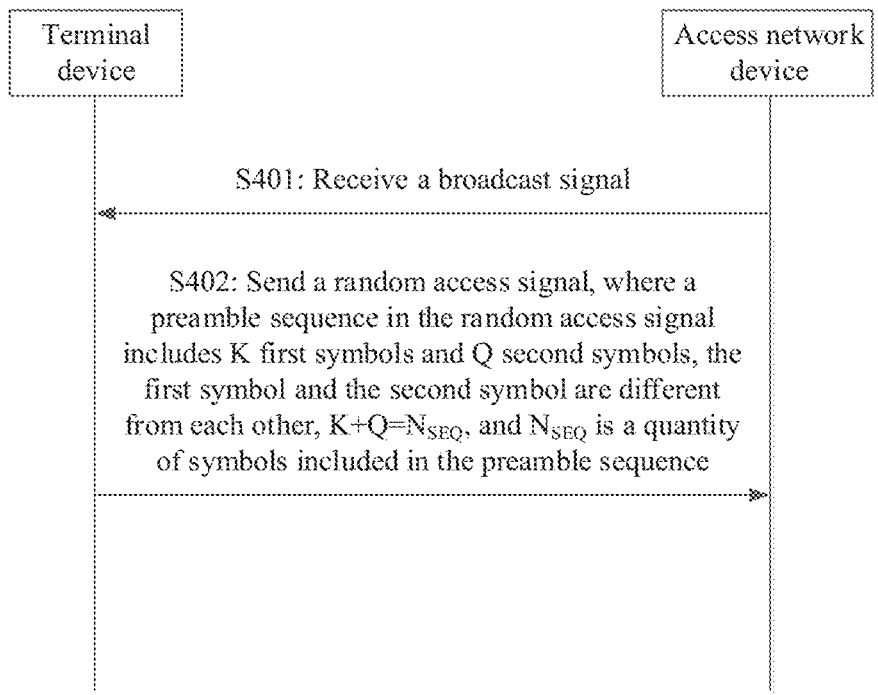
FIG. 4 is a schematic flowchart of a random access method according to an embodiment of this application.

FIG. 4 is a schematic diagram of a random access method according to an embodiment of this application. As shown in FIG. 4, the method includes the following steps.

S401: A terminal device receives a broadcast signal.

For example, the broadcast signal may be a broadcast signal sent by an access network device. The broadcast signal includes random access configuration information. The random access configuration information may be configuration information of a random access signal, so that the terminal device sends the random access signal based on the random access configuration information.

S402: The terminal device sends a random access signal, where a preamble sequence in the random access signal includes K first symbols and Q second symbols, the first symbol and the second symbol are different from each other, K and Q are integers greater than or equal to 1, $K+Q=N_{SEQ}$, and $N_{SEQ}$ is a quantity of symbols included in the preamble sequence.

That the first symbol and the second symbol are different from each other may mean that any one of the K first symbols is different from any one of the Q second symbols. "Different" may mean that information carried in the first symbol is different from information carried in the second symbol, may mean that a ZC sequence used to generate the first symbol is different from a ZC sequence used to generate the second symbol, or may mean that a ZC sequence used to fill the first symbol is different from a ZC sequence used to fill the second symbol.

The random access signal includes a CP, the preamble sequence, and a GT. Optionally, the random access signal including the first symbol and the second symbol may also be referred to as a non-repeated random access preamble sequence.

In this embodiment of this application, the first symbol and the second symbol that are different from each other are set in the preamble sequence in the random access signal, so that efficiency of random access signal detection can be improved, and an access requirement of a satellite communication system or another communications system can be satisfied.

Optionally, in some examples, the Q second symbols are the same. To be specific, information carried in the Q second symbols are the same, ZC sequences used to generate the Q second symbols are the same, or ZC sequences used to fill the Q second symbols are the same. The Q second symbols may be used to determine a fractional part of symbol timing. The fractional part of symbol timing may refer to a fractional part of the timing that corresponds when a preamble symbol is used as a timing unit. For example, when uplink timing exceeds a duration of one preamble symbol, the Q second symbols may be used to determine the fractional part of symbol timing. The fractional part of symbol timing may be determined by using a classic access detection algorithm of a ground communication system, or the fractional part of symbol timing may be determined by using another detection method. A specific detection algorithm is not limited in this embodiment of this application.

Optionally, in some examples, the K first symbols may be the same, or the K first symbols may be different from each other. Alternatively, the K first symbols may be generated by using same ZC sequences, or may be generated by using different ZC sequences. The K first symbols may be used to determine an integral part of symbol timing. Alternatively, the K first symbols are further used to distinguish between a plurality of users.

Optionally, in some examples, filling content of the CP may be related to the preamble sequence. For example, the CP may be filled with a rearmost part that is of the preamble sequence and whose length is the same as that of the CP. For example, if $T_{CP}$=2.80 ms, and $T_{SEQ}$=60.40 ms, data with a length of 2.80 ms ranging from 3.60 ms to 6.40 ms in a preamble sequence part may be sequentially filled in the CP.

Optionally, in some examples, a GT part may not be filled with any data, may be filled with a segment of useless data to facilitate data processing, or may be filled in another manner.

Figure 5:
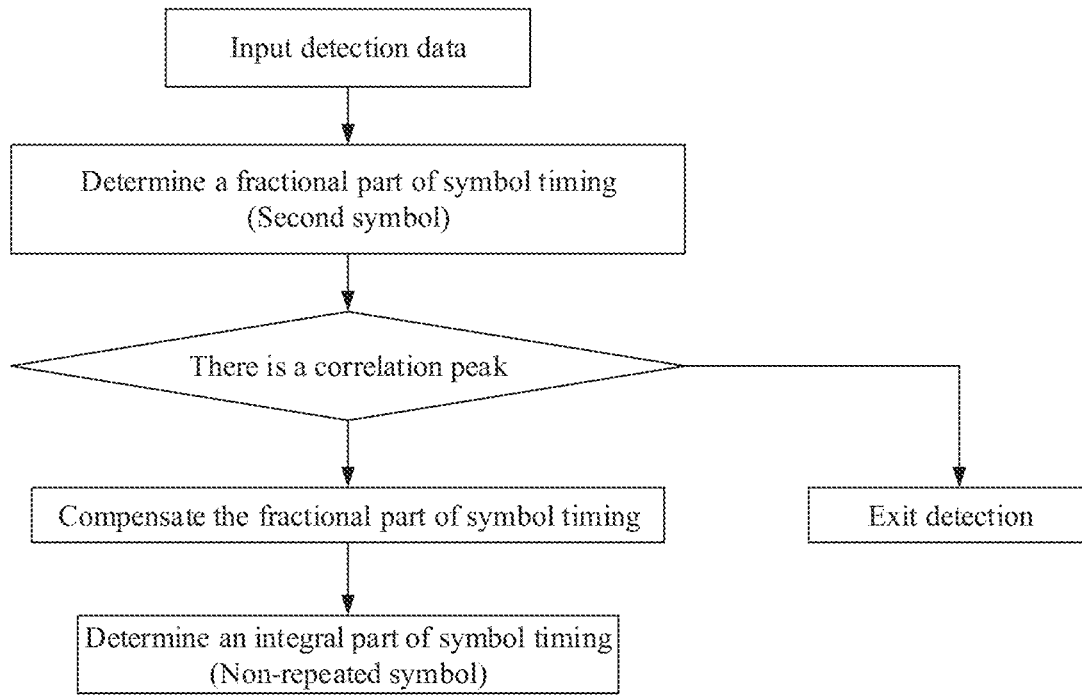
FIG. 5 is a schematic flowchart of uplink timing detection according to an embodiment of this application.

FIG. 5 is a schematic flowchart of uplink timing detection according to an embodiment of this application. FIG. 5 is applicable to a case in which $T_{CP}$ is greater than a duration of one preamble symbol. $T_{CP}$ may include an integral part of a symbol quantity and a fractional part of the symbol quantity. In other words, Tc may have a duration of a non-integer quantity of symbols. As shown in FIG. 5, when uplink timing is performed, a second symbol may be first detected by using an access detection algorithm, to determine a fractional part of symbol timing. Then, after the fractional part of timing is compensated, an integral part of symbol timing is determined by detecting a location of a first symbol.

In a ground communication system, because a maximum round trip transmission delay difference is relatively small, a length of a preamble signal in a random access signal is relatively short, and all symbols included in a preamble sequence are the same. In some examples of this application, to adapt to a requirement of a specification of a satellite communication system, a total length of the preamble sequence may be increased by increasing a quantity of the symbols included in the preamble sequence in the random access signal.

Optionally, in some examples, a subcarrier spacing used for the random access signal may be $\Delta f_{RA}$=1.25 kHz. Therefore, a duration of a symbol in the random access signal may be denoted as $T_{sym}$=1/$\Delta f_{RA}$=0.8 ms. $\Delta f_{RA}$ represents a subcarrier spacing, and $T_{sym}$ represents a length of the symbol in the random access signal. The symbol in the random access signal may also be referred to as a preamble symbol.

Figure 6:
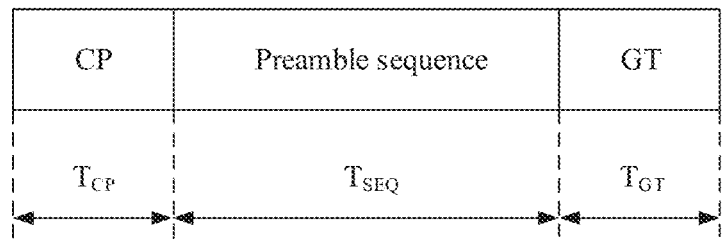
FIG. 6 is a schematic diagram of a random access signal in time domain according to another embodiment of this application.

FIG. 6 is a schematic diagram of a random access signal in time domain according to another embodiment of this application. As shown in FIG. 6, the random access signal includes a CP, a preamble sequence, and a GT. $T_{CP}$, $T_{SEQ}$, and $T_{GT}$ respectively represent time lengths of the CP, the preamble sequence, and the GT. In this embodiment of this application, based on a random access preamble sequence design criterion and a preamble format solution, a manner of filling by using a ZC sequence in the random access signal and the time lengths of the CP, the preamble sequence, and the GT are designed, and quantities and distribution forms of first symbols and second symbols in the preamble sequence are determined, to reduce complexity of detection performed by an access network device, and improve efficiency of random access signal detection.

Still referring to FIG. 6, in an example, a total length $T_{RA}$ of the random access signal may be set to an integer multiple of a subframe length. $T_{RA}=T_{CP}+T_{SEQ}+T_{GT}$, and a subframe length may be, for example, 1 ms. A length of the CP may be represented as $T_{CP}=(N_{CP}^i+N_{CP}^f)T_{sym}$, where $N_{CP}^i$ is used to represent an integral part of a symbol quantity, and $N_{CP}^f$ is used to represent a fractional part of the symbol quantity. $N_{CP}^i$ is an integer greater than or equal to 0, $N_{CP}^f$ is a fractional number, and $0 \leqslant N_{CP}^f < 1$. For a length of the preamble sequence, $T_{SEQ}=N_{SEQ} \times T_{sym}$, where $N_{SEQ}$ is a positive integer. For a length of the GT, $T_{GT}=(N_{GT}^i+N_{GT}^f)T_{sym}$, where $N_{GT}^i$ is used to represent an integral part of a symbol quantity, and $N_{GT}^f$ is used to represent a fractional part of the symbol quantity. $N_{GT}^i$ is an integer greater than or equal to 0, $N_{GT}^f$ is a fractional number, and $0 \leqslant N_{GT}^f < 1$. Optionally, lengths of the CP, the preamble sequence, and the GT may be all greater than a duration $T_{sym}$ of one preamble symbol.

In a possible implementation, the quantities of the first symbols and the second symbols may be enabled to be as equal or close as possible. K first symbols may be the same, or may be different from each other, and Q second symbols may be the same. For example, K=Q, or K=Q±1. Alternatively, in another example, the foregoing design idea may be understood as follows: When there is another boundary condition, the quantities of the first symbols and the second symbols are enabled to be as close as possible when the another boundary condition is satisfied.

For example, when $T_{CP} > T_{sym}$, a non-repeated random access preamble sequence may be used to perform uplink timing estimation. In a detection solution, an integral part of symbol timing is performed by using the first symbol, and a fractional part of symbol timing is performed by using the second symbol. Both the first symbol and the second symbol provide a detection gain for a final timing result. During design, quantities of the two types of symbols in the sequence should be balanced as much as possible. The preamble sequence includes $N_{SEQ}$ preamble symbols, where the $N_{SEQ}$ preamble symbols include K first symbols and Q ($Q=N_{SEQ}-K$) repeated symbols. A value of K may be enabled to be as close as possible to that of Q. For example, when $N_{SEQ}$=4, K=2 may be selected as a quantity of the first symbols.

In this embodiment of this application, the quantities of the first symbols and the second symbols in the preamble sequence in the random access signal are designed, so that performance of random access signal detection can be optimized.

Optionally, in some examples, the K first symbols and the Q second symbols satisfy at least one of the following conditions:

(1) an interval between any two of the K first symbols$\geq N_{CP}^i$;

(2) $N_{SEQ} \geq K \times (N_{CP}^i, +1)$; and (3) $T_{SEQ} \geq T_{CP} \geq \Delta T_{RTD}$, and $T_{SEQ} \leq T_{GT} \leq \Delta T_{RTD}$.

$N_{CP}^i$ represents an integral part of a quantity of symbols included in the cyclic prefix, $T_{SEQ}$ represents a time length of the preamble sequence, $T_{CP}$ represents the time length of the cyclic prefix, $T_{GT}$ represents the time length of the guard time, and $\Delta T_{RTD}$ represents a maximum round trip transmission delay difference in a cell.

The foregoing condition (1) includes: An interval between every two of the K first symbols$\leq N_{CP}^i$. The foregoing condition (3) may be understood as that the time lengths of the CP, the preamble sequence, and the GT need to satisfy a constraint condition of the maximum round trip transmission delay difference in a cell. When the foregoing condition is satisfied, a performance gain of random access signal detection can be improved.

In some examples, when the foregoing condition is satisfied, the K first symbols may be the same.

In some examples, K may be a maximum number that satisfies the foregoing conditions. Alternatively, it may be understood as that when the foregoing condition is satisfied, the quantity of first symbols is increased as much as possible. This improves the performance gain of random access signal detection. In addition, in some other examples, when the foregoing condition is satisfied, the quantities of the first symbols and the second symbols may be enabled to be as close as possible, to improve the performance gain of random access signal detection. That the foregoing condition is satisfied may mean that one or more or all of the foregoing conditions are satisfied.

Figure 7:
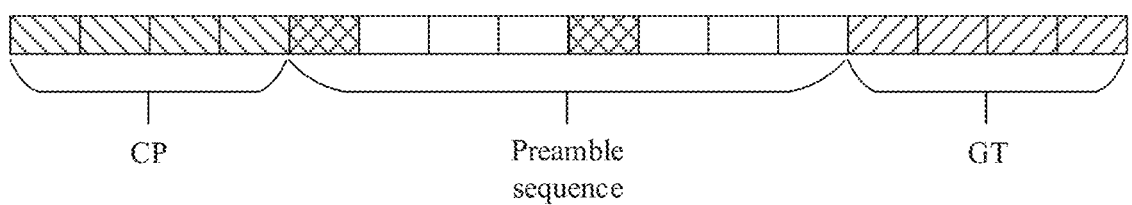
FIG. 7 is a schematic diagram of distribution of a format of a random access preamble according to an embodiment of this application.

FIG. 7 is a schematic diagram of distribution of a format of a random access preamble sequence that satisfies the foregoing conditions according to an embodiment of this application. It is assumed that an orbit height of a satellite is 700 km, a minimum elevation of a user is 10°, and a radius of a beam cell is 200 km. For an edge cell of a system, maximum round trip delay $RTD_{max}$=14.42 ms, minimum round trip delay $RTD_{min}$=11.82 ms, and symbol length $T_{sym}$=0.8 ms. Therefore, maximum round trip transmission delay difference $\Delta T_{RTD}$=$RTD_{max}$−$RTD_{min}$=2.6 ms. $\Delta T_{RTD}$>$T_{sym}$.

As shown in FIG. 7, the random access preamble sequence includes a CP, a preamble sequence, and a GT. $T_{CP}$=2.80 ms, $T_{SEQ}$=60.40 ms, and $T_{GT}$=2.80 ms. These satisfy a requirement of a constraint condition of $\Delta T_{RTD}$ in the beam cell. In this case, time lengths of the CP and the GT are 3.5 preamble symbols, and the preamble sequence includes eight preamble symbols. The first and the fifth preamble symbols in the preamble sequence are used to fill first symbols, and remaining preamble symbols in the preamble sequence are used to fill second symbols. The distribution of the format satisfies the foregoing conditions (1) to (3), where K=2, and Q=6. In addition, the CP may also be used to fill a second symbol. Optionally, the second symbols are the same, and the first symbols may be the same or different.

Figure 8:
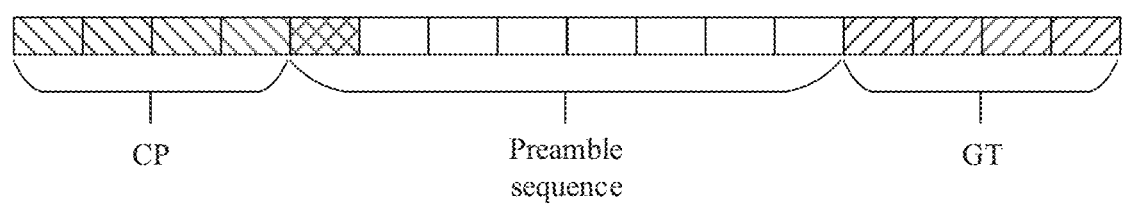
FIG. 8 is a schematic diagram of distribution of a format of a random access preamble according to another embodiment of this application.

Optionally, a maximum number when the foregoing condition is satisfied may be selected as K. This improves performance of random access signal detection. For example, FIG. 8 is a schematic diagram of distribution of a random access preamble sequence according to another embodiment of this application. Basic parameters of an application environment in FIG. 8 are the same as those in FIG. 7. However, in FIG. 8, on the basis of satisfying the foregoing condition, one first symbol is designed. That is, K=1. Specifically, $T_{CP}$=2.80 ms, $T_{SEQ}$=60.40 ms, and $T_{GT}$=2.80 ms. Time lengths of a CP and a GT are 3.5 preamble symbols, and a preamble sequence includes eight preamble symbols. The first preamble symbol in the preamble sequence is used to fill a first symbol, and remaining preamble symbols in the preamble sequence are used to fill second symbols. The CP may also be used to fill a second symbol.

Figure 9:
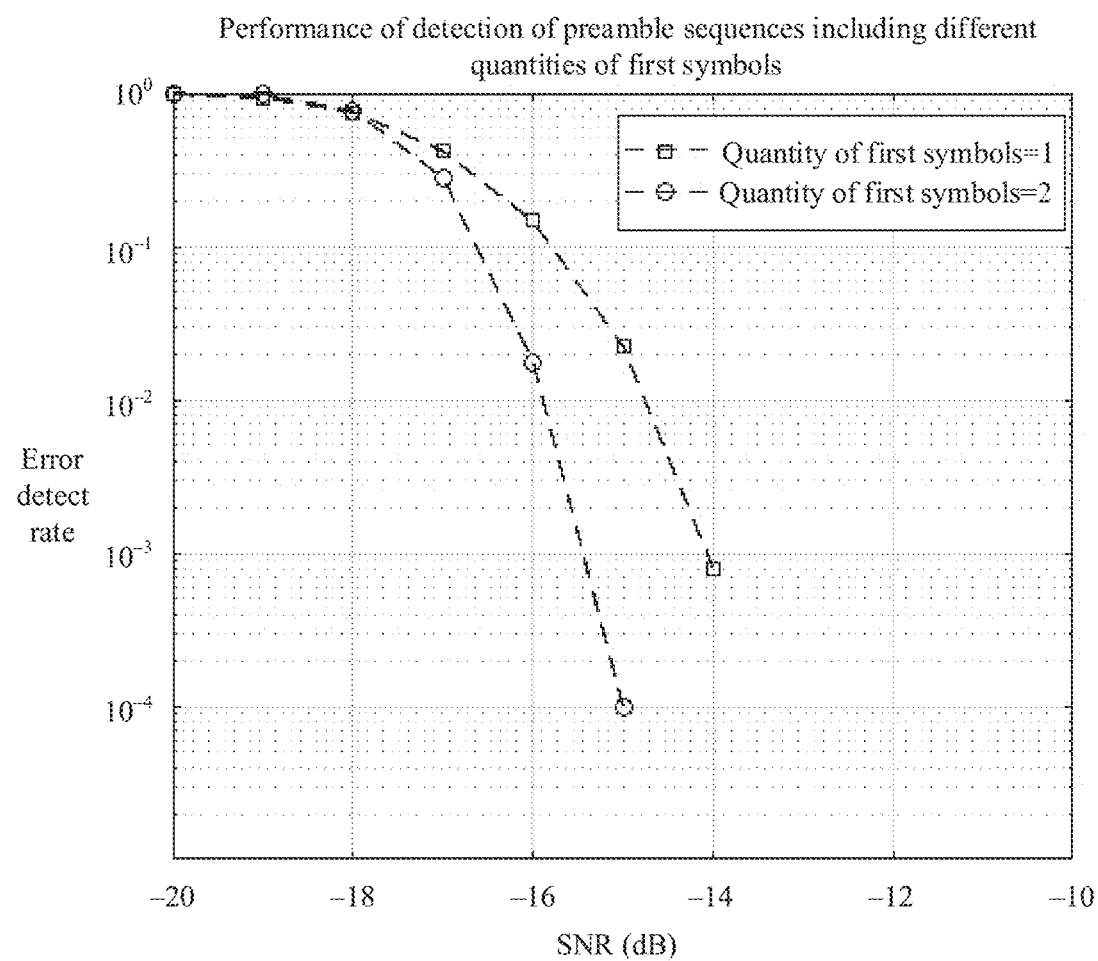
FIG. 9 is a schematic diagram of performance of random access signal detection according to an embodiment of this application.

FIG. 9 is a schematic diagram of performance of detection of the random access preamble sequences corresponding to FIG. 7 and FIG. 8. As shown in FIG. 9, a horizontal coordinate indicates a signal-to-noise ratio (SNR) of a received signal, and a vertical coordinate indicates an error detect rate (error detect rate) of random access. When a signal-to-noise ratio is specified, compared with a random access signal format for which only one first symbol is used, when a random access signal format for which two first symbols are used, an error detect rate is lower. Therefore, the random access preamble sequence in FIG. 7 obtains a larger detection performance gain by increasing a value of K.

An embodiment of this application further provides a design solution of a non-repeated random access preamble format. In this design solution, ZC sequences for generating a first symbol and a second symbol are designed, so that more preamble sequences can be obtained by using as few ZC sequences with different roots as possible.

In some examples, the K first symbols are the same. The first symbol is generated based on a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $N_{U1}$ and $N_{U2}$ are integers greater than or equal to 1, $1 \leq u_1 \leq N_{U1}$, and $1 \leq u_2 \leq N_{U2}$.

In this embodiment of this application, when the K first symbols are the same, in the foregoing design solution, the ZC sequences for generating the first symbol and the second symbol are designed, so that more preamble sequences can be obtained by using as few ZC sequences with different roots as possible, to improve random access efficiency.

In a specific example, the foregoing manner of generating a non-repeated random preamble sequence may include the following steps.

(1) All available ZC sequences with different roots in a cell are divided into two sets $U_1$ and $U_2$. Each ZC sequence corresponds to a different root. Each ZC sequence corresponds to a root sequence number. A ZC sequence in the set $U_1$ is only used to generate the first symbol, and a ZC sequence in the set $U_2$ is only used to generate the second symbol.

(2) If a terminal device in the cell intends to initiate a random access procedure, a to-be-used preamble sequence may be generated in the following manner: selecting the $u_1^{th}$ ZC sequence from the set $U_1$ to generate the K first symbols, where the K first symbols are the same, and are all generated by using the $u_1^{th}$ ZC sequence; and selecting the $u_2^{th}$ ZC sequence from the set $U_2$ to generate the Q second symbols, where the Q second symbols are the same, and are all generated by using the $u_2^{th}$ ZC sequence. Parameters {$u_1$ and $u_2$} are used to jointly determine a preamble sequence. As long as either of $u_1$ and $u_2$ that are selected by a terminal device is different, it is considered that different preamble sequences are used. In some examples, because each ZC sequence in the set $U_1$ and the set $U_2$ corresponds to a different root sequence number, $u_1$ and $u_2$ may also be replaced with root sequence numbers of ZC sequences. That is, the root sequence numbers are used to represent and distinguish between the ZC sequences with different roots.

According to the foregoing preamble sequence generation manner, if the set $U_1$ includes $N_{U1}$ root sequence numbers, and the set $U_2$ includes $N_{U2}$ root sequence numbers, a total quantity of preamble sequences that can be generated is $N_{U1} \times N_{U2}$. For example, it is assumed that a single cell needs 64 preamble sequences. If a case in which same symbols are used in a preamble sequence is considered, because a simple cyclically shifting manner cannot be used to generate more preamble sequences for a satellite communication system, a total of 64 ZC sequences with different roots are needed. If a case in which a preamble sequence consists of the first symbol and the second symbol is considered, for example, it may be set that $N_{U1}=8$ and $N_{U2}=8$, the 64 preamble sequences can be generated by using only 16 ZC sequences with different roots, so that needed ZC sequences with different roots can be reduced.

In this embodiment of this application, based on a feature of a non-repeated random access sequence detection algorithm, the first symbol and the second symbol are filled by using ZC sequences, so that preamble sequences can be generated by using as few sequences with different root as possible, to distinguish between different users, thereby effectively improving random access efficiency.

In some examples, the K first symbols are different from each other. The K first symbols are generated based on ZC sequences in K third sets, each of the K third sets includes M ZC sequences generated by cyclically shifting a $u_1^{th}$ ZC sequence in a first set, and the second symbol is generated based on a $u_2^{th}$ ZC sequence in a second set, where the first set includes $N_{U1}$ ZC sequences with different roots, the second set includes $N_{U2}$ ZC sequences with different roots, an intersection of the first set and the second set is an empty set, $1 \leq u_1 \leq N_{U1}$, $1 \leq u_2 \leq N_{U2}$, and M is an integer greater than or equal to 1; the K third sets satisfy the following condition: $CS_i=\{i \times N_{CS,1}, i \times N_{CS,2}, \ldots, i \times N_{CS,M}\}$, where $i=1, \ldots$, or K, $CS_i$ represents a set of M cyclic shift offsets corresponding to M ZC sequences included in an $i^{th}$ third set, and $1 \leq i \leq K$; and the K first symbols correspond one-to-one to the K third sets, where an $i^{th}$ first symbol is generated by using a ZC sequence whose cyclic shift offset is $i \times N_{cs,m}$ and that is in the it third set, and $1 \leq m \leq M$.

In this embodiment of this application, when the K first symbols are different from each other, a cyclic shift offset of a ZC sequence used for the K first symbols is used as a constraint, so that when the K first symbols are generated by using ZC sequences with a same root and different cyclic shift offsets, impact that is on performance of preamble sequence detection and that is caused by a larger maximum round trip transmission delay difference can be reduced or eliminated, so that more preamble sequences can be obtained by using as few ZC sequences with different roots as possible, thereby improving random access efficiency.

The non-repeated random preamble sequence shown in FIG. 7 is used as an example. Assuming that K=2, and the two first symbols are different, the manner of generating the non-repeated random preamble sequence may include the following steps.

(1) Available ZC sequences with different roots in a cell are divided into two sets $U_1$ and $U_2$. Each ZC sequence corresponds to a different root. Each ZC sequence corresponds to a root sequence number. A ZC sequence in the set $U_1$ is only used to generate the first symbol, and a ZC sequence in the set $U_2$ is only used to generate the second symbol. The first symbol is generated by using a ZC sequence obtained by cyclically shifting the ZC sequence in the set $U_1$, and the ZC sequence used for the second symbol has no cyclic shift offset.

(2) If a terminal device in the cell intends to initiate a random access procedure, a to-be-used preamble sequence may be generated in the following manner: selecting the $u_1^{th}$ ZC sequence from the set $U_1$, where the $1^{st}$ first symbol is generated by using a ZC sequence whose sequence number is $u_1$ and whose cyclic shift offset is $N_{CS,m}$, the $2^{nd}$ first symbol is generated by using a ZC sequence whose sequence number is $u_1$ and whose cyclic shift offset is $2N_{CS,m}$; and selecting the $u_2^{th}$ ZC sequence from the set $U_2$ to generate the Q second symbols, where the Q second symbols are the same, and are all generated by using the $u_2^{th}$ ZC sequence. Therefore, it may be considered that parameters $\{N_{CS,m}, u_1, u_2\}$ are used to jointly determine a preamble sequence. As long as one of $N_{CS,m}$, $u_1$, and $u_2$ that are selected by a user is different, it may be considered that different random access preamble sequences are used.

It may be considered that the first symbol is generated based on the ZC sequences in the K third sets, and the K third sets have one-to-one correspondence with the K first symbols. Each third set includes the M ZC sequences generated by cyclically shifting the $u_1^{th}$ ZC sequence in the first set. When K=2, the third set satisfies the following conditions: $CS_1=\{N_{CS,1}, N_{CS,2}, \ldots, N_{CS,M}\}$, and $CS_2=\{2 \times N_{CS,1}, 2 \times N_{CS,2}, \ldots, 2 \times N_{CS,M}\}$. $CS_1$ and $CS_2$ respectively represent a set of M cyclic shift offsets corresponding to M ZC sequences included in the first third set and a set of M cyclic shift offsets corresponding to M ZC sequences included in the second third set. A ZC sequence whose cyclic shift offset is $N_{CS,m}$ is selected from the first third set for the $1^{st}$ first symbol, and a ZC sequence whose shift offset is $2_{NCS,m}$ is selected from the second third set for the $2^{nd}$ first symbol, where $1 \leq m \leq M$.

Optionally, when K=2 or is greater than 2, the K third sets satisfy the following condition: $CS_i=\{i \times N_{CS,1}, i \times N_{CS,2}, \ldots, i \times N_{CS,M}\}$, where $i=1, \ldots$, or K, $CS_i$ represents a set of M cyclic shift offsets corresponding to M ZC sequences included in an $i^{th}$ third set, and $1 \leq i \leq K$. The K first symbols have one-to-one correspondence with the K third sets, where an $i^{th}$ first symbol is generated by using a ZC sequence whose cyclic shift offset is $i \times N_{cs,m}$ and that is in the $i^{th}$ third set, and $1 \leq m \leq M$.

In some examples, because each ZC sequence in the set $U_1$ and the set $U_2$ corresponds to a different root sequence number, $u_1$ and $u_2$ may also be replaced with root sequence numbers of ZC sequences. That is, the root sequence numbers are used to represent and distinguish between the ZC sequences with different roots.

According to the foregoing preamble sequence generation manner, if the set $U_1$ includes $N_{U1}$ root sequence numbers, the set $U_2$ includes $N_{U2}$ root sequence numbers, and each third set includes M ZC sequences, a total quantity of preamble sequences that can be used is $M \times N_{U1} \times N_{U2}$, so that a quantity of available preamble sequences is greatly increased.

Optionally, in some examples, when the third set satisfies at least one of the following conditions, impact that is on performance of preamble sequence detection and that is caused by a larger maximum round trip transmission delay difference can be reduced or eliminated. The following conditions are applicable to both a case in which K=2 and a case in which K is greater than 2.

(1) Any two elements in the sets CS1 and CS2 are different from each other.

(2) A sum of any two different elements in the set $CS_1$ does not belong to the set $CS_2$.

Optionally, in some other examples, when the third set satisfies at least one of the following conditions, impact that is on performance of preamble sequence detection and that is caused by a larger maximum round trip transmission delay difference can be reduced or eliminated. The following conditions are applicable to both a case in which K=2 and a case in which K is greater than 2.

(1) Any two elements in the set $CS_i$ and the set $CS_j$ are different from each other, where $CS_i$ represents the set of the M cyclic shift offsets corresponding to the M ZC sequences included in the $i^{th}$ third set, and $1 \leq i \leq K$; $CS_j$ represents a set of cyclic shift offsets corresponding to M ZC sequences included in a $j^{th}$ third set, $1 \leq j \leq K$, and $i \neq j$.

(2) A sum of any two different elements in the set $CS_i$ does not belong to the set $CS_j$.

Optionally, when the foregoing condition is satisfied, when K=2 or is greater than 2, even if same $u_1$ and same $u_2$ are selected for preamble sequences, and the preamble sequences are aliased together based on different time differences, the access network device may distinguish between different $N_{CS,m}$ based on a detection algorithm.

Optionally, in this embodiment of this application, a manner of selecting the ZC sequences for generating the first symbol and the second symbol is not limited to the foregoing examples. Alternatively, the ZC sequences for generating the first symbol and the second symbol may be selected in another manner. This is not limited in this embodiment of this application.

In this embodiment of this application, a plurality of users that perform contention access may be distinguished by designing the K first symbols based on the feature of the non-repeated random access sequence detection algorithm. A method for superimposing specific cyclic shift offset on a root sequence of the first symbol enables a design solution to distinguish between a plurality of users by using as few sequences with different roots as possible, thereby effectively improving access efficiency.

Figure 10:
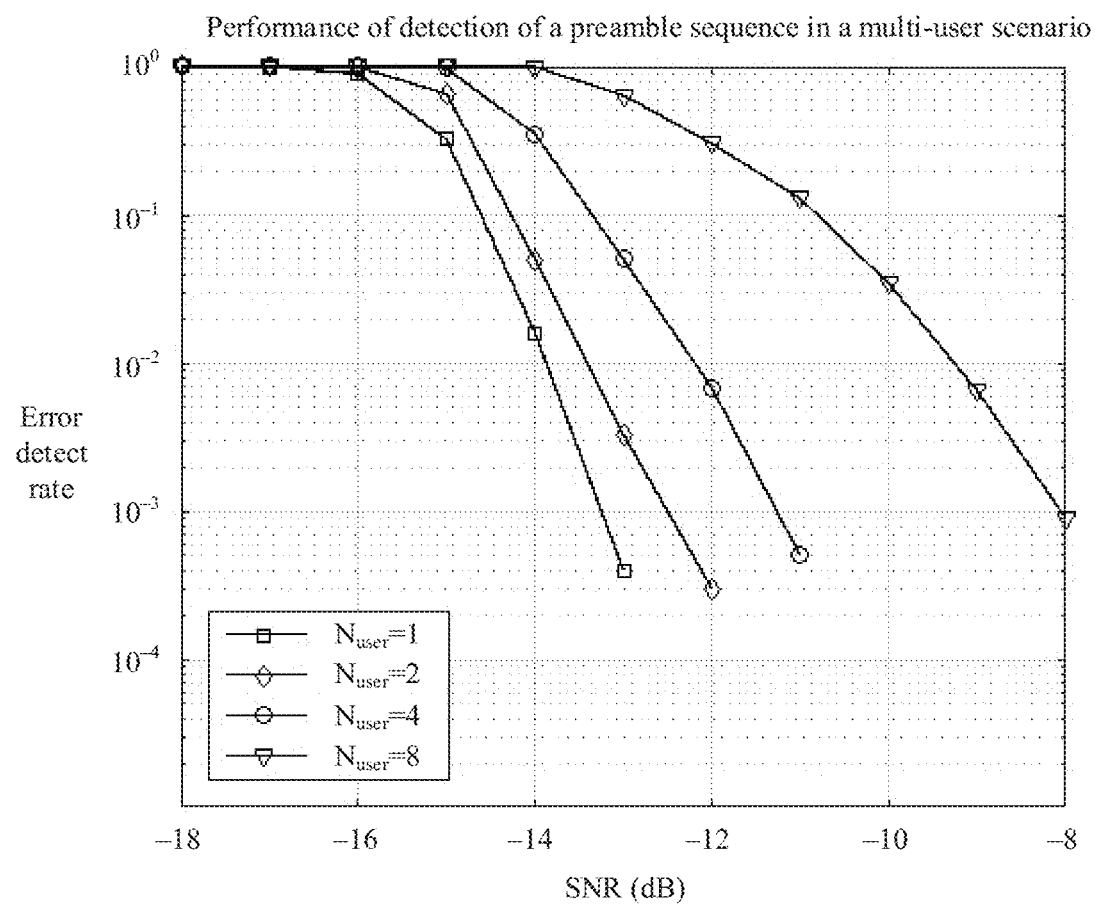
FIG. 10 is a schematic diagram of performance of random access signal detection according to another embodiment of this application.

FIG. 10 is a schematic diagram of performance of non-repeated random access preamble sequence according to an embodiment of this application. FIG. 10 shows performance of detection of a non-repeated random access preamble sequence in a multi-user scenario. The non-repeated random access preamble sequence shown in FIG. 7 is used in FIG. 10. FIG. 10 separately shows performance of preamble sequence detection when a user quantity $N_{user}$ is 1, 2, 4, or 8. Parameters $\{u_1, u_2\}$ used by the plurality of users are the same, and a difference lies in that cyclic shift offsets $N_{cs,m}$ corresponding to the users are different. In addition, when random access preamble signals of different users are transmitted by using a same time-frequency resource and almost simultaneously arrive at an access network device, error detect rates of the access network device for access signals of different quantities of users are shown in FIG. 10.

In FIG. 10, a horizontal coordinate represents a signal-to-noise ratio of a received signal, and a vertical coordinate represents an error detect rate of the access network device for access signals of different quantities of users. Detection is considered to be correct only when uplink synchronization locations of all users are correctly detected. It can be learned from error detect rate curves corresponding to different user quantities in FIG. 10 that the access network device can distinguish between and detect different users and corresponding uplink synchronization locations. Therefore, it can be learned from FIG. 10 that, even if different users select preamble sequences corresponding to $u_1$ and $u_2$ that are the same, and $u_1$ and $u_2$ are aliased together based on different time differences, the access network device may distinguish between different $N_{CS,m}$ based on a detection algorithm.

The random access method in the embodiments of this application is described above in detail with reference to FIG. 1 to FIG. 10. Apparatuses in the embodiments of this application are described below in detail with reference to FIG. 11 to FIG. 13.

Figure 11:
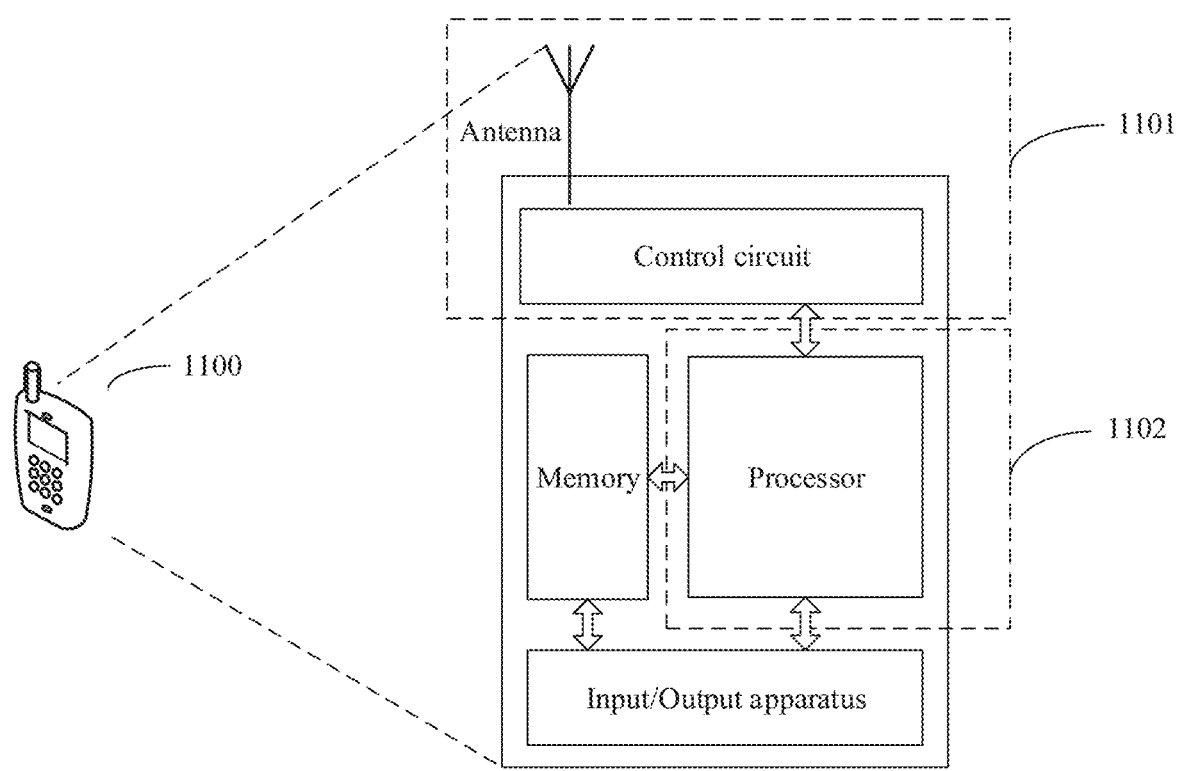
FIG. 11 is a schematic structural diagram of a terminal device according to an embodiment of this application.

FIG. 11 is a schematic structural diagram of a terminal device according to an embodiment of this application. The terminal device is applicable to performing functions of the terminal device in the foregoing method embodiments. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing the actions described in the foregoing embodiment of the method, for example, sending the random access signal. The memory is mainly configured to store the software program and data. The control circuit is mainly configured to: perform conversion between a baseband signal and a radio frequency signal, and process the radio frequency signal. A combination of the control circuit and the antenna may also be referred to as a transceiver, and is mainly configured to send and receive a radio frequency signal in a form of an electromagnetic wave. The input/output apparatus such as a touchscreen, a display, or a keyboard is mainly configured to receive data input by a user and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

In this embodiment of this application, the antenna and the control circuit that have a transceiver function may be considered as a transceiver unit 1101 of the terminal device 1100. For example, the transceiver unit 1101 is configured to support the terminal device in performing the receiving function and the sending function described in FIG. 4. The processor having a processing function is considered as a processing unit 1102 of the terminal device 1100. As shown in FIG. 11, the terminal device 1100 includes the transceiver unit 1101 and the processing unit 1102. The transceiver unit may also be referred to as a transceiver, a transceiver apparatus, or the like. Optionally, a component that is configured to implement a receiving function and that is in the transceiver unit 1101 may be considered as a receiving unit, and a component that is configured to implement a sending function and that is in the transceiver unit 1101 may be considered as a sending unit. That is, the transceiver unit 1101 includes the receiving unit and the sending unit. The receiving unit may also be referred to as a receiver, an input port, a receiving circuit, or the like. The sending unit may be referred to as a transmitter, a transmitter, a transmitting circuit, or the like.

The processor 1102 may be configured to execute an instruction stored in the memory, to control the transceiver unit 1101 to receive a signal and/or send a signal, to complete a function of the terminal device in the foregoing method embodiment. In an implementation, a function of the transceiver unit 1101 may be considered to be implemented by using a transceiver circuit or a transceiver-dedicated chip.

Figure 12:
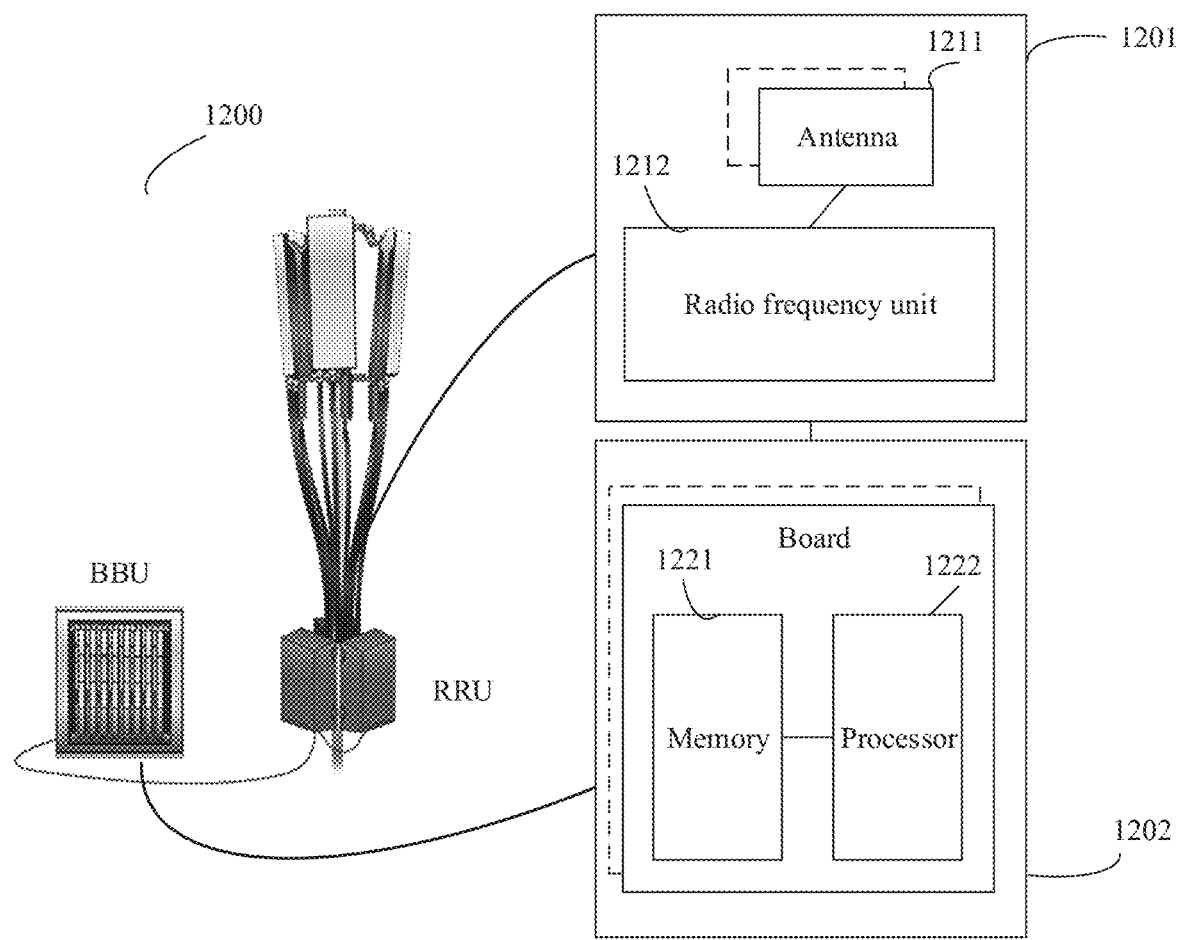
FIG. 12 is a schematic structural diagram of an apparatus according to an embodiment of this application.

FIG. 12 is a schematic structural diagram of an apparatus 1200 according to an embodiment of this application. For example, FIG. 12 may be a schematic structural diagram of a access network device. As shown in FIG. 12, the apparatus 1200 is applicable to the application environment described in FIG. 1 or another part of the embodiments of this application. The access network device may include one or more radio frequency units such as a remote radio unit (RRU) 1201 and one or more baseband units (BBU) (which may also be referred to as a digital unit, DU) 1202. The RRU 1201 may be referred to as a transceiver unit, a transceiver, a transceiver circuit, a transceiver, or the like, and may include at least one antenna 1211 and a radio frequency unit 1212. The RRU 1201 is mainly configured to send and receive a radio frequency signal, and perform conversion between the radio frequency signal and a baseband signal. For example, the RRU 1201 is configured to receive a random access signal or send a broadcast signal. The BBU 1202 is mainly configured to perform baseband processing, control the access network device, and so on. The RRU 1201 and the BBU 1202 may be physically disposed together, or may be physically separated, in other words, in a distributed access network device.

The BBU 1202 is a control center of the access network device, may also be referred to as a processing unit, and is mainly configured to implement a baseband processing function, for example, channel coding, multiplexing, modulation, and spreading. For example, the BBU (the processing unit) may be configured to control the access network device to perform operation procedures related to the access network device in the foregoing method embodiment.

In an example, the BBU 1202 may include one or more boards, and a plurality of boards may jointly support a radio access network (such as an LTE network) of a single access standard, or may separately support radio access networks of different access standards. The BBU 1202 further includes a memory 1221 and a processor 1222. The memory 1221 is configured to store a necessary instruction and necessary data. For example, the memory 1221 stores the preset information, the codebook, and the like in the foregoing embodiments. The processor 1222 is configured to control the access network device to perform a necessary action, for example, is configured to control the access network device to perform the operation procedures related to the access network device in the foregoing method embodiment. The memory 1221 and the processor 1222 may serve one or more boards. In other words, a memory and a processor may be separately disposed on each board. Alternatively, a plurality of boards may share a same memory and a same processor. In addition, a necessary circuit may be further disposed on each board.

Optionally, the apparatus 1200 may be disposed on a satellite, or may be disposed in a ground station. This is not limited in this embodiment of this application.

Figure 13:
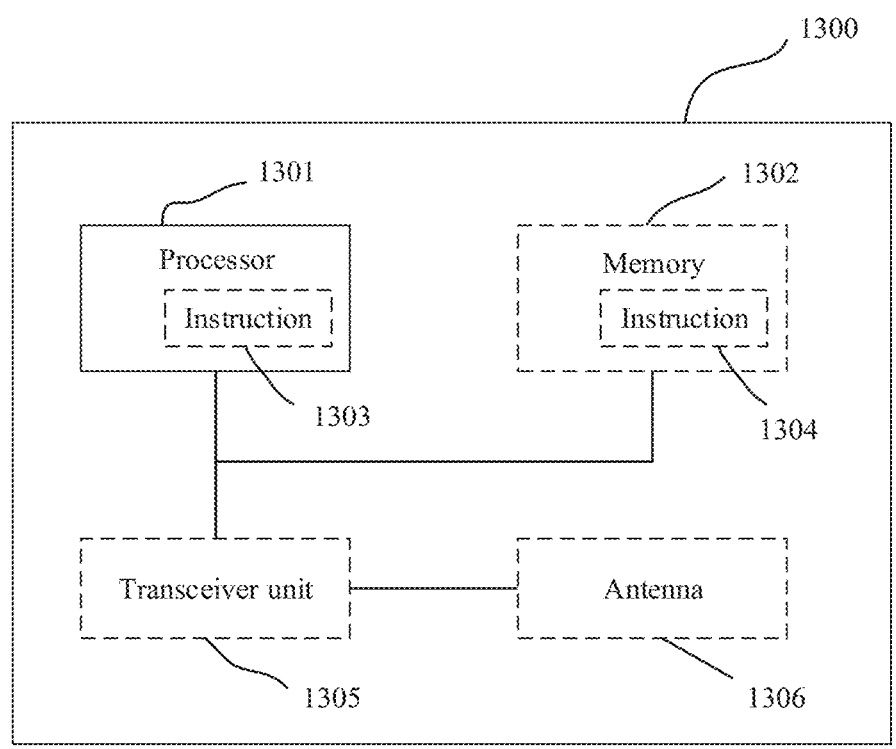
FIG. 13 is a schematic structural diagram of an apparatus according to another embodiment of this application.

FIG. 13 is a schematic structural diagram of a communications apparatus 1300. The apparatus 1300 may be configured to implement the method described in the foregoing method embodiment. Refer to the description in the foregoing method embodiment. The communications apparatus 1300 may be a chip, an access network device (for example, a base station), a terminal device, another access network device, or the like.

The communications apparatus 1300 includes one or more processors 1301. The processor 1301 may be a general purpose processor, a dedicated processor, or the like. For example, the processor 1301 may be a baseband processor or a central processing unit. The baseband processor may be configured to process a communications protocol and communication data. The central processing unit may be configured to control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input circuit and/or an output circuit or a communications interface of the chip. The chip may be used by a terminal, a base station, or another access network device. For another example, the communications apparatus may be a terminal, a base station, or another access network device, and the transceiver unit may be a transceiver, a radio frequency chip, or the like.

The communications apparatus 1300 includes the one or more processors 1301, and the one or more processors 1301 may implement the method performed by the access network device or the terminal device in the embodiment shown in FIG. 4.

In a possible design, the communications apparatus 1300 includes a means configured to generate a random access signal and a means configured to send the random access signal. Functions of the means for generating the random access signal and the means for sending the random access signal may be implemented by using one or more processors. For example, the random access signal may be generated by using the one or more processors, and sent by using the transceiver, the input/output circuit, or the interface of the chip. For the random access signal, refer to related descriptions in the foregoing method embodiment.

In a possible design, the communications apparatus 1300 includes a means configured to receive a random access signal and a means configured to detect the random access signal. For a method for receiving and detecting the random access signal, refer to related descriptions in the foregoing method embodiment. For example, the random access signal may be received by using the transceiver, the input/output circuit, or the interface of the chip, and detected by using one or more processors.

Optionally, the processor 1301 may further implement another function in addition to the method in the embodiment shown in FIG. 4.

Optionally, in a design, the processor 1301 may execute instructions, so that the communications apparatus 1300 performs the method described in the foregoing method embodiment. All or a part of the instructions, for example, an instruction 1303, may be stored in the processor. Alternatively, all or a part of the instructions, for example, an instruction 1304, may be stored in a memory 1302 coupled to the processor. Alternatively, the communications apparatus 1300 may be enabled, by using both instructions 1303 and 1304, to perform the method described in the foregoing method embodiment.

In another possible design, the communications apparatus 1300 may alternatively include a circuit. The circuit may implement a function of the access network device or the terminal device in the foregoing method embodiment.

In another possible design, the communications apparatus 1300 may include one or more memories 1302. The memory stores an instruction 1304. The instruction may be run on the processor, so that the communications apparatus 1300 performs the method described in the foregoing method embodiment. Optionally, the memory may further store data. Optionally, the processor may alternatively store an instruction and/or data. For example, the one or more memories 1302 may store the correspondence described in the foregoing embodiments, or the related parameter or table in the foregoing embodiments. The processor and the memory may be separately disposed, or may be integrated together.

In another possible design, the communications apparatus 1300 may further include a transceiver unit 1305 and an antenna 1306. The processor 1301 may be referred to as a processing unit, and controls the communications apparatus (a terminal or a base station). The transceiver unit 1305 may be referred to as a transceiver, a transceiver circuit, a transceiver, or the like, and is configured to implement a transceiver function of the communications apparatus by using the antenna 1306.

This application further provides a communications system, including the foregoing one or more access network devices and one or more terminal devices.

It should be noted that the processor in the embodiments of this application may be an integrated circuit chip, and has a signal processing capability. In the implementation process, the steps in the foregoing method embodiment may be completed by using a hardware integrated logical circuit in the processor or by using instructions in a form of software. The foregoing processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware in a decoding processor and a software module.

The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (Synchlink DRAM, SLDRAM), and a direct rambus random access memory (direct rambus RAM, DR RAM). It should be noted that the memory in the system and the method that are described in this specification includes but is not limited to these and any memory of another proper type.

An embodiment of this application further provides a computer-readable medium. The computer-readable medium stores a computer program. When the computer program is executed by a computer, the random access method in any one of the foregoing method embodiments is implemented.

An embodiment of this application further provides a computer program product. When the computer program product is executed by a computer, the random access method in any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the random access method in any one of the foregoing method embodiments.

It should be understood that the processing apparatus may be a chip. The processor may be implemented by using hardware, or may be implemented by using software. When implemented by using the hardware, the processor may be a logic circuit, an integrated circuit, or the like. When implemented by using the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

In addition, the terms "system" and "network" may be usually used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining A based on B does not mean that B is determined based only on A. That is, B may also be determined based on A and/or other information.

A person of ordinary skill in the art may be aware that, the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed systems, apparatuses, and methods may be implemented in other manners. For example, the foregoing apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by using hardware, firmware, or a combination thereof. When this application is implemented by using software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of an instruction or a data structure and can be accessed by the computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. For example, a disk (disk) and a disc (disc) used in this application includes a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

In conclusion, the foregoing descriptions are merely example embodiments of the technical solutions in this application, but are not intended to limit the protection scope of this application. Any modification, equivalent replacement, or improvement made without departing from the spirit and principle of this application shall fall within the protection scope of this application.

What is claimed is:

1. A method, comprising:
receiving, by a terminal device, a broadcast signal comprising random access configuration information; and
sending, by the terminal device according to the random access configuration information, a random access signal, wherein a preamble sequence comprised in the random access signal comprises K first symbols and Q second symbols, at least one first symbol of the K first symbols is different than at least one second symbol of the Q second symbols, K and Q are integers greater than or equal to 1, $K+Q=N_{SEQ}$, and $N_{SEQ}$ is a quantity of symbols comprised in the preamble sequence; and
wherein the random access signal further comprises a cyclic prefix, the preamble sequence, and a guard time, and the K first symbols and the Q second symbols satisfy at least one of the following first conditions:
$N_{SEQ} \geq K \times (N_{CP}^i + 1)$; or
$T_{SEQ} \geq T_{CP} \geq \Delta T_{RTD}$, and $T_{SEQ} \geq T_{GT} \geq \Delta T_{RTD}$; and
wherein $N_{CP}^i$ represents an integral part of a quantity of symbols comprised in the cyclic prefix, $T_{SEQ}$ represents a time length of the preamble sequence, $T_{CP}$ represents a time length of the cyclic prefix, $T_{GT}$ represents a time length of the guard time, and $\Delta T_{RTD}$ represents a maximum round trip transmission delay difference in a cell.

2. The method according to claim 1, wherein each of the Q second symbols are the same.

3. The method according to claim 1, wherein K is a maximum number that satisfies at least one of the first conditions.

4. The method according to claim 1, wherein:
each of the K first symbols are the same; or
each of the K first symbols are different from each other.

5. The method according to claim 4, wherein each of the K first symbols are the same first symbol, the same first symbol is generated based on a $u_1^{th}$ ZC sequence in a first set, and each of the Q second symbols are generated based on a $u_2^{th}$ ZC sequence in a second set, wherein the first set comprises $N_{U1}$ ZC sequences with different roots, the second set comprises $N_{U2}$ ZC sequences with different roots, an intersection of the first set and the second set is an empty set, $N_{U1}$ and $N_{U2}$ are integers greater than or equal to 1, $1 \leq u_1 \leq N_{U1}$, and $1 \leq u_2 \leq N_{U2}$.

6. The method according to claim 4, wherein:
each of the K first symbols are different from each other, the K first symbols are generated based on ZC sequences in K third sets, each of the K third sets comprises M ZC sequences generated by performing cyclic shifting based on a $u_1^{th}$ ZC sequence in a first set, and each of the Q second symbols is generated based on a $u_2^{th}$ ZC sequence in a second set, wherein the first set comprises $N_{U1}$ ZC sequences with different roots, the second set comprises $N_{U2}$ ZC sequences with different roots, an intersection of the first set and the second set is an empty set, $1 \leq u_1 \leq N_{U1}$, $1 \leq u_2 \leq N_{U2}$, and M is an integer greater than or equal to 1;

the K third sets satisfy the following condition: $CS_i = \{i \times N_{CS,1}, i \times N_{CS,2}, \ldots, i \times N_{CS,M}\}$, wherein $i=1, \ldots,$ or K, $CS_i$ represents a set of M cyclic shift offsets corresponding to M ZC sequences comprised in an $i^{th}$ third set, and $1 \leq i \leq K$; and
the K first symbols have a one-to-one correspondence with the K third sets, wherein an $i^{th}$ first symbol is generated using a ZC sequence whose cyclic shift offset is $i \times N_{cs,m}$ and that is in the $i^{th}$ third set, and $1 \leq m \leq M$.

7. A method, comprising:
sending, by an access network device, a broadcast signal comprising random access configuration information; and
receiving, by the access network device according to the random access configuration information, a random access signal, wherein a preamble sequence comprised in the random access signal comprises K first symbols and Q second symbols, at least one first symbol of the K first symbols is different than at least one second symbol of the Q second symbols, K and Q are integers greater than or equal to 1, $K+Q=N_{SEQ}$, and $N_{SEQ}$ is a quantity of symbols comprised in the preamble sequence; and
wherein the random access signal further comprises a cyclic prefix, the preamble sequence, and a guard time, and the K first symbols and the Q second symbols satisfy at least one of the following first conditions:
$N_{SEQ} \geq K \times (N_{CP}^i + 1)$; or
$T_{SEQ} \geq T_{CP} \geq \Delta T_{RTD}$, and $T_{SEQ} \geq T_{GT} \geq \Delta T_{RTD}$; and
wherein $N_{CP}^i$ represents an integral part of a quantity of symbols comprised in the cyclic prefix, $T_{SEQ}$ represents a time length of the preamble sequence, $T_{CP}$ represents a time length of the cyclic prefix, $T_{GT}$ represents a time length of the guard time, and $\Delta T_{RTD}$ represents a maximum round trip transmission delay difference in a cell.

8. The method according to claim 7, wherein each of the Q second symbols is the same.

9. The method according to claim 7, wherein K is a maximum number that satisfies at least one of the first conditions.

10. The method according to claim 7, wherein:
each of the K first symbols are the same; or
each of the K first symbols are different from each other.

11. The method according to claim 10, wherein each of the K first symbols are the same, the same first symbol is generated based on a $u_1^{th}$ ZC sequence in a first set, and Q second symbols are generated based on a $u_2^{th}$ ZC sequence in a second set, wherein the first set comprises $N_{U1}$ ZC sequences with different roots, the second set comprises $N_{U2}$ ZC sequences with different roots, an intersection of the first set and the second set is an empty set, $N_{U1}$ and $N_{U2}$ are integers greater than or equal to 1, $1 \leq u_1 \leq N_{U1}$, and $1 \leq u_2 \leq N_{U2}$.

12. The method according to claim 10, wherein:
the K first symbols are different from each other, the K first symbols are generated based on ZC sequences in K third sets, each of the K third sets comprises M ZC sequences generated by performing cyclic shift based on a $u_1^{th}$ ZC sequence in a first set, and each of the Q second symbols is generated based on a $u_2^{th}$ ZC sequence in a second set, wherein the first set comprises $N_{U1}$ ZC sequences with different roots, the second set comprises $N_{U2}$ ZC sequences with different roots, an intersection of the first set and the second set is an empty set, $1 \leq u_1 \leq N_{U1}$, $1 \leq u_2 \leq N_{U2}$, and M is an integer greater than or equal to 1;

the K third sets satisfy the following condition: $CS_i = \{i \times N_{CS,1}, i \times N_{CS,2}, \ldots, i \times N_{CS,M}\}$, wherein $i=1, \ldots,$ or K, $CS_i$ represents a set of M cyclic shift offsets corresponding to M ZC sequences comprised in an $i^{th}$ third set, and $1 \le i \le K$; and the K first symbols correspond one-to-one to the K third sets, wherein an $i^{th}$ first symbol is generated by using a ZC sequence whose cyclic shift offset is $i \times N_{cs,m}$ and that is in the $i^{th}$ third set, and $1 \le m \le M$.

13. A terminal device, comprising:
a memory;
a processor; and
a transceiver;
wherein the memory is configured to store a computer program; and
wherein the processor is configured to execute the computer program stored in the memory; and when the computer program is executed, the processor is configured to:
receive, using the transceiver, a broadcast signal comprising random access configuration information; and
send, according to the random access configuration information, a random access signal by using the transceiver, wherein a preamble sequence comprised in the random access signal comprises K first symbols and Q second symbols, at least one first symbol of the K first symbols is different than at least one second symbol of the Q second symbols, K and Q are integers greater than or equal to 1, $K+Q=N_{SEQ}$, and $N_{SEQ}$ is a quantity of symbols comprised in the preamble sequence; and
wherein the random access signal further comprises a cyclic prefix, the preamble sequence, and a guard time, and the K first symbols and the Q second symbols satisfy at least one of the following first conditions:
$N_{SEQ} \ge K \times (N_{CP}^i + 1)$; or
$T_{SEQ} \ge T_{CP} \ge \Delta T_{RTD}$, and $T_{SEQ} \ge T_{GT} \ge \Delta T_{RTD}$; and
wherein $N_{CP}^i$ represents an integral part of a quantity of symbols comprised in the cyclic prefix, $T_{SEQ}$ represents a time length of the preamble sequence, $T_{CP}$ represents a time length of the cyclic prefix, $T_{GT}$ represents a time length of the guard time, and $\Delta T_{RTD}$ represents a maximum round trip transmission delay difference in a cell.

14. The terminal device according to claim 13, wherein each of the Q second symbols are the same.

15. The terminal device according to claim 13, wherein K is a maximum number that satisfies the at least one of the first conditions.

16. The terminal device according to claim 13, wherein:
each of the K first symbols are the same; or
the K first symbols are different from each other.

17. The terminal device according to claim 16, wherein:
the K first symbols are different from each other, the K first symbols are generated based on ZC sequences in K third sets, each of the K third sets comprises M ZC sequences generated by performing cyclic shift based on a $u_1^{th}$ ZC sequence in a first set, and each of the Q second symbols is generated based on a $u_2^{th}$ ZC sequence in a second set, wherein the first set comprises $N_{U1}$ ZC sequences with different roots, the second set comprises $N_{U2}$ ZC sequences with different roots, an intersection of the first set and the second set is an empty set, $1 \le u_1 \le N_{U1}$, $1 \le u_2 \le N_{U2}$, and M is an integer greater than or equal to 1;

the K third sets satisfy the following condition: $CS_i = \{i \times N_{CS,1}, i \times N_{CS,2}, \ldots, i \times N_{CS,M}\}$, wherein $i=1, \ldots,$ or K, $CS_i$ represents a set of M cyclic shift offsets corresponding to M ZC sequences comprised in an $i^{th}$ third set, and $1 \le i \le K$; and the K first symbols correspond one-to-one to the K third sets, wherein an $i^{th}$ first symbol is generated by using a ZC sequence whose cyclic shift offset is $i \times N_{cs,m}$ and that is in the $i^{th}$ third set, and $1 \le m \le M$.

18. The method according to claim 1, wherein the K first symbols and the Q second symbols satisfy the first condition of $N_{SEQ} \ge K \times (N_{CP}^i + 1)$.

19. The method according to claim 1, wherein the K first symbols and the Q second symbols satisfy the first condition of $T_{SEQ} \ge T_{CP} \ge \Delta T_{RTD}$, and $T_{SEQ} \ge T_{GT} \ge \Delta T_{RTD}$.

20. The method according to claim 7, wherein the K first symbols and the Q second symbols satisfy the first condition of $N_{SEQ} \ge K \times (N_{CP}^i + 1)$.

21. The method according to claim 7, wherein the K first symbols and the Q second symbols satisfy the first condition of $T_{SEQ} \ge T_{CP} \ge \Delta T_{RTD}$, and $T_{SEQ} \ge T_{GT} \ge \Delta T_{RTD}$.

22. The terminal device according to claim 13, wherein the K first symbols and the Q second symbols satisfy the first condition of $N_{SEQ} \ge K \times (N_{CP}^i + 1)$.

23. The terminal device according to claim 13, wherein the K first symbols and the Q second symbols satisfy the first condition of $T_{SEQ} \ge T_{CP} \ge \Delta T_{RTD}$, and $T_{SEQ} \ge T_{GT} \ge \Delta T_{RTD}$.

* * * * *